Sept. 8, 1970 A. F. PELSTER 3,527,247
PRESSURE RELIEF VALVE
Filed Jan. 15, 1969
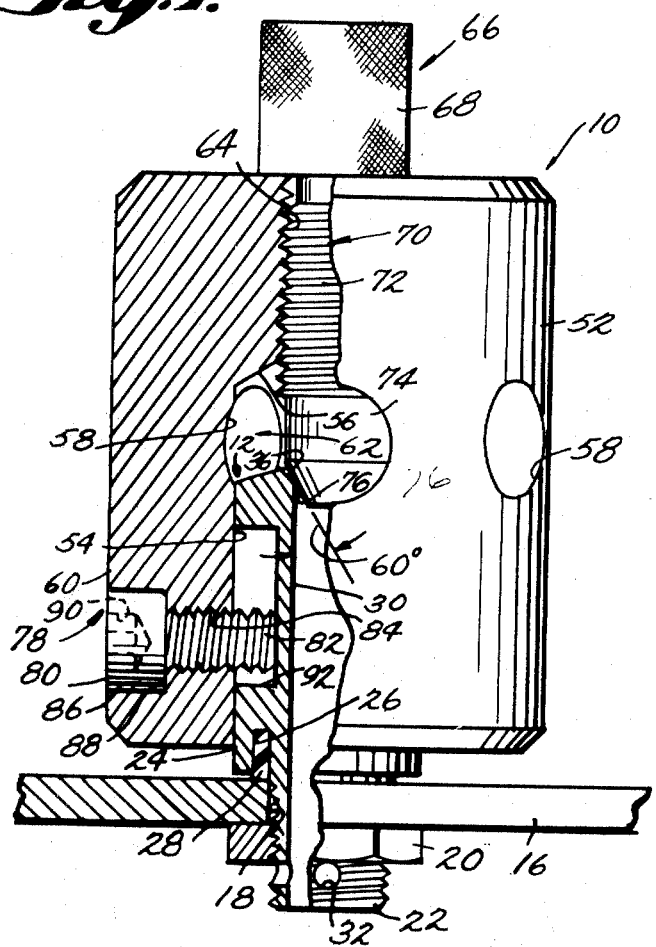
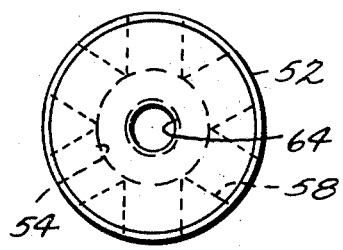
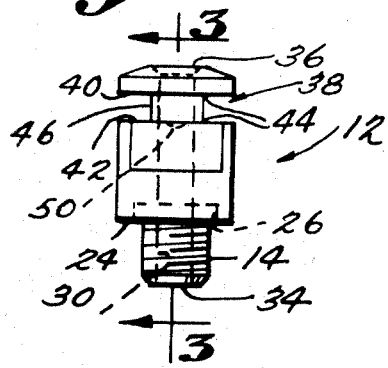
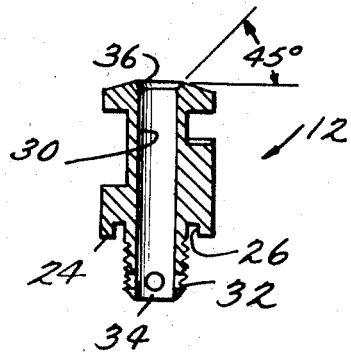
INVENTOR
ARTHUR F. PELSTER
BY Cushman, Darby & Cushman
ATTORNEYS 3,527,247
PRESSURE RELIEF VALVE
Arthur F. Pelster, Nashville, Tenn., assignor to Kentucky Fried Chicken Corporation, Nashville, Tenn., a corporation of Kentucky
Filed Jan. 15, 1969, Ser. No. 791,470
Int. Cl. F16k 17/00
U.S. Cl. 137—523               17 Claims

ABSTRACT OF THE DISCLOSURE

A quick release pressure relief valve including a dead weight valve member seated upon a valve seat adapted to be secured in the lid of a pressure vessel. A flat on the valve seat permits axial, non-rotatable movement between the weight and the valve seat while a circumferential groove contiguous with the top of the flat permits rotatable, non-axial relative movement.

BACKGROUND OF THE INVENTION

This invention relates to a pressure relief valve for pressure vessels, such as cookers, and more particularly to a quick release dead-weight type of relief valve.

It has long been known to use a pressure relief valve of the type having a weighted valve head adapted to seat upon the vent of a vent tube mounted in the lid of the pressure cooker. A set screw or the like cooperates with an axial groove to permit axial movement of the weighted head. In some instances, the prior art has used an axial flat to permit axial movement of the weighted head while preventing rotational movement thereof. To release the pressure in the cooker quickly, however, one would have to lift up the weighted head and hold the same in a raised position until all of the pressure had been released. However, the steam is apt to burn the individual. Until the present invention, there was no way in which the weighted head could be maintained in its raised position.

SUMMARY OF THE INVENTION

The present invention not only incorporates the advantages of using a dead weight, but the present relief valve also provides a means for maintaining the dead weight in a raised position for quickly venting pressure from the pressure vessel. To accomplish this purpose, there has been provided a circumferential groove in the valve seat above a flat. A set screw cooperates with the flat to permit axial, non-rotatable movement of the dead weight until the set screw becomes aligned with the circumferential groove. The set screw cooperates with the circumferential groove to permit rotation of the dead weight. Once the set screw has been rotated beyond alignment with the flat, it can rest upon the lower shoulder of the groove and thus maintain the weight in a raised position. When the weight is moved into a raised position, the vent passageway is unsealed and pressure can be vented quickly to the atmosphere.

A further object of the invention is to provide a radial groove in the lower shoulder of the circumferential groove in which the set screw can be seated so as to inhibit rotatable movement of the dead weight once it is moved into its raised position and rotated.

BRIEF DESCRIPTION OF DRAWINGS

FIG. 1 is an enlarged, side elevation view, partly in section, of the relief valve;

FIG. 2 is a side elevation view of the valve seat;

FIG. 3 is a sectional view taken substantially along the line 3—3 of FIG. 2; and FIG. 4 is a plan view of the dead weight.

DETAILED DESCRIPTION OF INVENTION

The assembled pressure relief valve 10 is illustrated in FIG. 1. An annular valve seat 12 having an integral, threaded, coaxial, depending stem 14 is fixedly secured in the lid 16 of the pressure vessel, such as a commercial pressure cooker. The valve seat is shown in detail in FIGS. 2 and 3. The threaded valve stem 14 extends through a smooth-surfaced hole 18 in the lid. A lock nut 20 is threaded on the free end 22 of the valve stem and affixedly secures the valve stem in the cooker lid. The valve seat 12 can be described as having a depending annular skirt 24 which cooperates with the stem to define receives a non-reactive, resilient sealing ring 28. The an axially downwardly opening annular groove 26 which sealing ring 28, for instance, could be made out of a fluorocarbon resin such as polytetrafluoroethylene sold under the trademark "Teflon" by Du Pont or polychlorotrifluoroethylene sold under the trademark "Kel–F" by M. W. Kellogg Company. While not preferable, the nut 20 could also have an axially upwardly opening annular groove in which a similar sealing member is received.

The valve seat and stem have a vertical axial passageway or throughbore 30 extending therethrough so that pressure can escape from the pressure vessel. Preferably, or laterally directed holes 32 communicating with the the stem 14 is also provided with a plurality of radially axial passageway 30. These holes 32 are located adjacent the lower end 22 of the stem so that the nut 20 does not interfere with the flow of steam through these holes. The lateral holes provide auxiliary exhaust ports should the lower end 34 of the axial passageway 30 become clogged. The upper end of this axial passageway is defined by a smooth annular beveled surface or chamfer 36.

The valve seat has a radially outwardly opening circumferential groove 38 defined by axially spaced, facing upper 40 and lower 42 shoulder surfaces. The surfaces are joined at their radially inward ends 44 by a circumferential radially outwardly facing root surface 46. The upper shoulder surface is annular. The lower shoulder surface is partially annular, one side of this surface being interrupted by a flat 48 which is tangent to the root surface. The lower shoulder surface also has an upwardly facing, preferably shallow groove 50 extending from the root surface radially outwardly. As illustrated, this groove is aligned perpendicularly to the flat.

There is also provided a dead weight 52 which is adapted to be slidably and axially received on the valve seat 12 and to seal the vent passageway 30 of the valve seat. The dead weight may be designed to maintain any desired pressure within the pressure vessel. For instance, in one operative embodiment of the invention, the dead weight maintains approximately 15 p.s.i.g. in the pressure cooker. The counterweight is illustrated as being annular and is provided with a central, axially downwardly opening, annular cavity or socket 54 of slightly greater diameter than the diameter of the valve seat, for permitting axial and rotatable relative movement between the valve seat 12 and the weight 52. Yet, the clearance is not so great as to permit the weight to become cocked. For instance, the diameter may be one or two one-hundredths of an inch greater than that of the valve seat at its widest point. Thus, the diameter of the valve stem might be .75 inch while the diameter of the central bore might be .76 or .77 inch. The axial, interior termination of the cavity is defined by an end wall 56. A plurality of radially directed exhaust holes or ports 58 are cut through the side wall 60 of the weight and communicate with the upper portion 62 of the cavity adjacent the end wall 56 of the cavity. A threaded bore 64 extends upwardly from the end wall 56 of the cavity 54 and coaxially with the cavity.

There is also provided a valve needle 66 having a head 68 which has been knurled for gripping purposes. The valve needle 66 also has an integral stem 70, a portion 72 of which is threaded. The stem is threadably secured in the threaded bore 64 of the weight. The lower inner end 74 of the stem of the valve needle has a smooth chamfer 76. The chamfered surface 76 of the stem is adapted to seal with the chamfered surface 36 of the valve seat. The angle of the chamfer 76 defining the lower end of the valve needle is preferably greater than the angle of the chamfer 36 defining the upper end of the axial passageway. As illustrated valve needle chamfer 76 is 60° while the valve seat chamfer 36 is 45°.

There is also provided a set screw 78 which has a head 80 and a threaded stem 82. The threaded stem extends through a threaded bore 84 in the side wall 60 of the weight. A countersink 86 is provided to receive the annular head 80 of the set screw. The distance between the base 88 of the countersink and the flat 48 is slightly larger than the axial length of the threaded stem 82 of the set screw so that the set screw will not press against the flat and restrict axial movement of the weight. The head of the set screw is also illustrated as having a hexagonal socket 90 for receiving an instrument to rotate the set screw into a position where the head engages the base of the countersink.

It will be seen that when the valve needle is completely screwed down in the weight, its inner end 74, and more specifically the chamfer 76, will engage and rest upon the chamfer 36 of the passageway extending through the valve seat to support the weight above the surface of the lid. For instance, it will be noted that the set screw does not bear against the lateral surface 92 defining the lower end of the flat. The flat permits axial movement of the weight while preventing rotational movement of the weight. When the weight is raised until the set screw is aligned with the circumferential groove in the valve seat, the weight can be rotated so that the set screw is received within the groove. The set screw is rested upon the lower shoulder so that the weight will be maintained in a raised position in which the axial passageway is free to exhaust steam pressure therethrough and through the radial bores or exhaust ports in the side wall of the weight to the atmosphere. Preferably the set screw is placed in the groove to prevent any undesirable rotational movement of the weight during the release of steam pressure.

While the preferred embodiment of the invention has been illustrated in the drawings and discussed above, it should be adequately clear that considerable modification may be made thereto without departing from the principles of the invention. Therefore, the foregoing should be considered in an illustrative sense rather than a limiting sense, and accordingly the extent of this invention should be limited only by the spirit and scope of the claims appended hereto.

What is claimed is:

1. A pressure relief valve comprising:
an annular valve seat having a coaxial depending stem adapted to be fixedly secured in the lid of a pressure vessel, the valve seat and stem having a vertical, axial passageway extending therethrough, the valve seat having a radially outwardly opening circumferential groove defined by axially spaced, facing upper and lower shoulder surfaces joined at radially inward ends by a circumferential, radially outwardly facing root surface and having a flat which is tangent to the root surface and intersects the lower shoulder surface, the upper shoulder surface being substantially annular;
a weight having a central, downwardly opening, annular cavity of slightly greater diameter than the diameter of the valve seat for axially receiving the valve seat and for permitting axial and rotatable relative movement between the valve seat and the weight, and the weight having vent means communicating with the cavity, the cavity having an upper end wall, the cavity of the weight axially receiving the valve seat;
sealing means associated with the interior end of the cavity for seating upon and sealing the upper end of the vertical passageway when the weight is in its lowermost position; and
set screw means extending substantially radially through the side wall of the weight into the cavity, the set screw means cooperating with the flat to permit axial non-rotatable movement of the weight with respect to to valve seat in a first position and cooperating with the circumferential groove of the valve seat to permit rotatable, substantially non-axial movement of the weight with respect to the valve seat in a second position.

2. The pressure relief valve defined in claim 1 wherein the lower shoulder surface has a upwardly facing groove extending radially outwardly and adapted to receive the set screw means in the second position.

3. The pressure relief valve defined in claim 1 wherein the upper end of the axial passageway of the valve seat is defined by a chamfer.

4. The pressure relief valve defined in claim 1 wherein the valve seat has a depending annular skirt which with the stem defines an axially downwardly opening annular groove and additionally including an annular sealing member received in the downwardly opening groove.

5. The pressure relief valve defined in claim 4 wherein the stem is threaded and additionally including a nut threadably secured on the stem and adapted to secure the stem in the lid of the pressure vessel and to cause the annular sealing member to seal against the lid of the pressure vessel.

6. The pressure relief valve as defined in claim 4 wherein the sealing member is made of polytetrafluoroethylene.

7. The pressure relief valve defined in claim 1 wherein the stem is threaded and additionally including a nut threadably secured on the stem and adapted to secure the stem has a plurality of radial directed holes com- 8. The pressure relief valve defined in claim 1 wherein the stem has a plurality of radially directed holes communicating with the axial passageway of the stem adjacent its lower free end.

9. The pressure relief valve defined in claim 1 wherein the set screw means comprises a screw threadably secured in the side wall of the weight.

10. The pressure relief valve defined in claim 9 wherein the screw has an annular, enlarged head and a threaded stem and wherein the side wall of the weight has a threaded stem and wherein the side wall of the weight has a threaded lateral bore communicating with the cavity of the weight and receiving the threaded stem of the set screw, the threaded bore of the side wall having a countersink for receiving the screw head, the countersink having a radially inward base.

11. The pressure relief valve defined in claim 10 wherein the distance between the base of the countersink and the flat is slightly greater than the length of the threaded stem of the screw so as to enable the weight to move freely on the valve seat.

12. The pressure relief valve defined in claim 1 wherein the vent means in the weight comprises a plurality of radially directed air passageways communicating with the cavity adjacent the upper end of the cavity.

13. The pressure relief valve defined in claim 1 wherein the weight has a threaded bore coaxial with the cavity of the weight and extending upwardly from the upper, interior end of the cavity and wherein the sealing means comprises a valve needle threadably received in the threaded bore, the valve needle having a lower end adapted to seal with the upper end of the axial, vertical passageway.

14. The pressure relief valve defined in claim 13 wherein the lower end of the valve needle is chamfered and is received in the upper end of the axial vertical passageway.

15. The pressure relief valve defined in claim 14 wherein the upper end of the axial passageway is defined by a chamfer.

16. The pressure relief valve defined in claim 15 wherein the angle of the chamfer defining the lower end of the valve needle is greater than the angle of the chamfer defining the upper end of the axial passageway.

17. A pressure relief valve comprising:
  an annular valve seat having an integral, threaded, coaxial, depending stem adapted to be fixedly secured in the lid of a pressure vessel, the valve seat and stem have a vertical axial passageway extending therethrough, the stem having a plurality of radially directed holes communicating with the axial passageway of the stem adjacent its lower end, the valve seat having a radially outwardly opening circumferential groove defined by axially spaced, facing upper and lower shoulder surfaces joined at radially inward ends by a circumferential, radially outwardly facing surface and having a flat which is tangent to the root surface and which intersects the lower shoulder surface, the upper shoulder surface being substantially annular and the lower shoulder surface having an upwardly facing shallow groove extending radially outwardly;
  a weight having a central, downwardly opening, annular cavity of greater diameter than the diameter of the valve seat for axially receiving the valve seat, and for permitting axial and rotatable relative movement between the valve seat and the weight, the weight having a plurality of radially directed air passages communicating with the upper portion of the cavity and a threaded bore coaxial with the cavity and extending upwardly from the upper, interior end of the cavity, the cavity axially receiving the valve seat;
  a valve needle threadably received in the threaded bore and having a lower end adapted to be received in and seal the vertical, axial passageway; and
  a set screw threadably received in and radially extending through the side wall of the weight into the cavity, the set screw cooperating with the flat to permit axial, non-rotatable movement of the weight with respect to the valve seat in a first position and cooperating with the circumferential groove of the valve seat to permit rotatable, substantially non-axial movement of the weight with respect to the valve seat in a second position.

References Cited
FOREIGN PATENTS 535,854 3/1955 Belgium.
556,282 4/1958 Canada.

WILLIAM F. O'DEA, Primary Examiner

D. J. ZOBKIW, Assistant Examiner

U.S. Cl. X.R.

137—533